United States Patent [19]
Watanabe

[11] Patent Number: 5,225,749
[45] Date of Patent: Jul. 6, 1993

[54] SYSTEM FOR CONTROLLING THE ROTATIONAL SPEED OF A ROTARY MEMBER

[75] Inventor: Miyochi Watanabe, Nagaokakyo, Japan

[73] Assignee: Mitsubishi Denki Kabushiki Kaisha, Tokyo, Japan

[21] Appl. No.: 877,805

[22] Filed: May 4, 1992

Related U.S. Application Data

[63] Continuation-in-part of Ser. No. 759,998, Sep. 13, 1991, abandoned.

[30] Foreign Application Priority Data

Sep. 26, 1990 [JP] Japan .................................. 2-257881

[51] Int. Cl.$^5$ .............................................. H02P 5/00
[52] U.S. Cl. ................................... 318/268; 318/464; 361/239; 361/240; 324/163
[58] Field of Search .............. 318/286, 461, 463, 464, 318/268; 388/902; 307/519; 361/236, 239, 240; 324/160, 163, 166, 168

[56] References Cited

U.S. PATENT DOCUMENTS

| | | |
|---|---|---|
| 3,355,649 | 11/1967 | Boylan et al. . |
| 3,409,814 | 11/1968 | Azuma et al. . |
| 3,596,162 | 7/1971 | Takayama . |
| 3,867,647 | 2/1975 | Callahan et al. ................ 307/265 X |
| 4,259,625 | 3/1981 | Hatakeyama et al. .......... 318/283 X |
| 4,321,901 | 3/1982 | Kobayashi et al. ................ 123/352 |
| 4,928,045 | 5/1990 | Doemen .............................. 318/464 |
| 5,023,924 | 6/1991 | Tajima et al. ....................... 388/811 |

FOREIGN PATENT DOCUMENTS

| | | |
|---|---|---|
| 2801520 | 11/1992 | Fed. Rep. of Germany . |
| 60-35975 | 2/1985 | Japan . |
| 2-19712 | 5/1990 | Japan . |

Primary Examiner—Bentsu Ro

[57] ABSTRACT

The present invention provides a system for controlling the rotational speed of a rotary member such as a video tape recorder drum or the like. The system detects a zero crossing interval in the output of a frequency generator, adding it to the subsequent zero crossing interval in the delayed output signal and using the result to control the motor or the like.

23 Claims, 11 Drawing Sheets

DELAY $T = T_C/2$

212 TRANSFER MEANS

COEFFICIENT

213 ADDER

FIG.14

$K_A$: GAIN

SYSTEM FOR CONTROLLING THE ROTATIONAL SPEED OF A ROTARY MEMBER

This application is a continuation-in-part of application Ser. No. 07/759,998 filed on Sep. 13, 1991, now abandoned. The entire contents of which are hereby incorporated by reference.

BACKGROUND OF THE INVENTION

Field of the Invention

The present invention relates to a system for controlling the rotational speed of a rotary member and particularly to such a system simplified in construction and improved in accuracy.

Description of the Related Art

Currently, many speed controllers for rotary members which are required to be rotated accurately at a constant speed, for example, a video tape recorder drum, capstan or the like, utilize a frequency generator (hereinafter called "FG") for generating an A.C. signal having a frequency proportional to the rotational speed of the rotary member and a speed detector for generating a control output corresponding to the FG signal.

Figure 3:
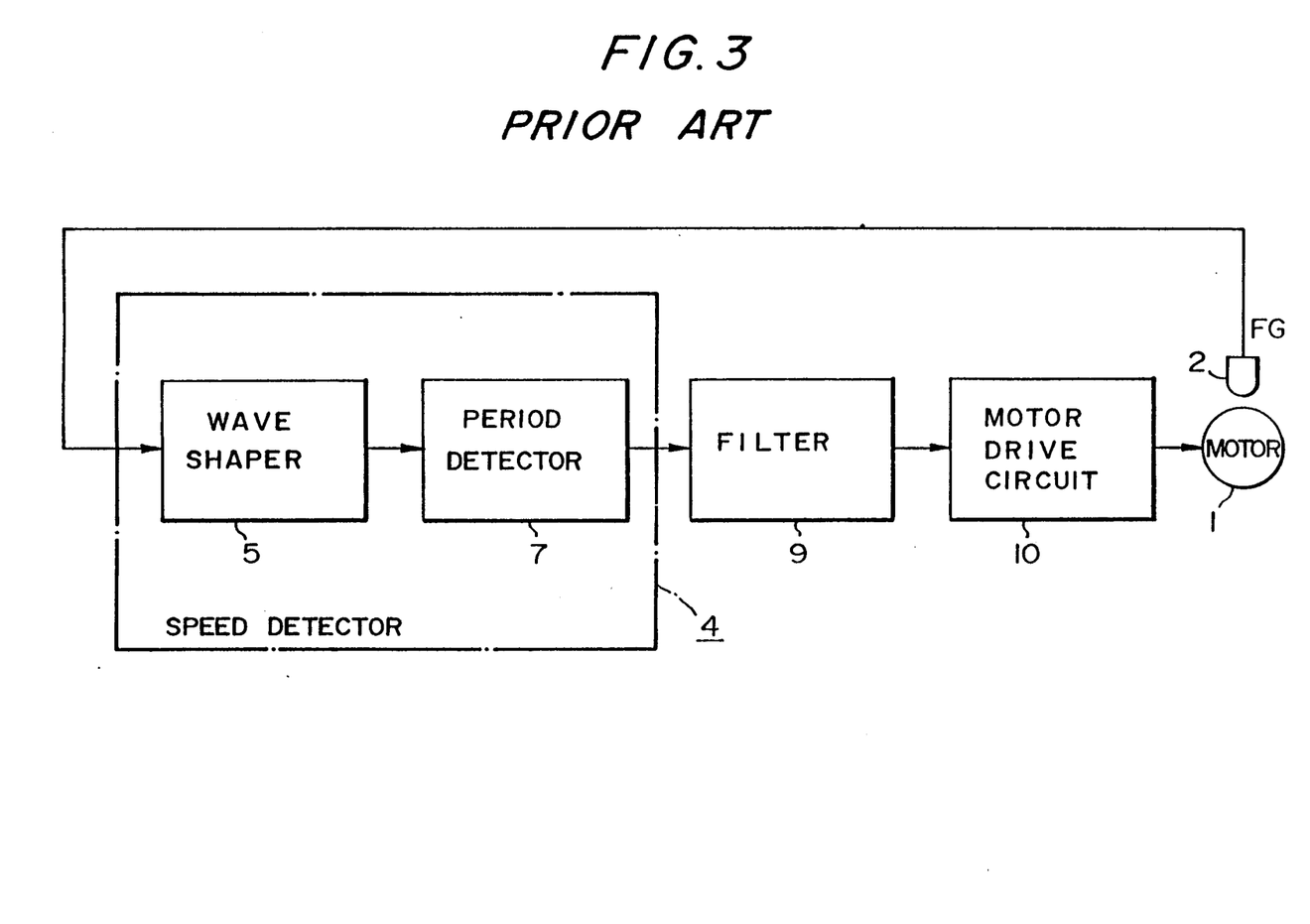
FIG. 3 is a block diagram of the circuit layout of a system for controlling the rotational speed of a rotary member, which is constructed in accordance with the prior art.

FIG. 3 is a block diagram illustrating the basic structure of such a speed controller according to the prior art. This speed controller comprises a motor to be controlled, an FG/2 for generating an FG signal, and a speed detector 4 for receiving the FG signal from the FG/2. The speed detector 4 comprises a wave shaper 15 for producing a speed proportion signal having leading and trailing edges from the FG signal, and a period detector 7 for detecting the period of the speed proportion signal and for generating a control output corresponding to the detected period. The speed controller further comprises a filter 9 for smoothing or phase compensating the control output from the period detector 7, and a motor drive circuit 10. As will be apparent, the speed controller is of a direct drive type wherein the rotary member is connected directly to the rotor of the motor 1.

In such a speed controller, it is generally known that the frequency in the FG should be set higher in order to improve the stability and rotational performance of the speed controller. As will be apparent later, this is because if the frequency of the FG is higher, the delay of phase in the speed detector 4 is correspondingly reduced and the ripple frequency of the output is similarly increased, thereby requiring a lower time constant in the subsequent filter 9 and increasing the phase margin in the control system.

However, the FG frequency cannot be thoughtlessly increased because of various limitations in the actual system. Thus, there have been made various proposals to enable the speed controller to perform sufficiently even at lower FG frequencies. One of the typical proposals is the use of a filter capable of effecting the phase compensation. However, the essential function of such a filter resides in stabilizing any system which is inherently unstabled or substantially unstable, by deforming the gain of the system or part of its phase frequency characteristic, but it cannot basically improve the performance of the speed control system as by increasing the frequency in the FG as described hereinbefore.

Since the entire operation of such a speed control system has been already known in the art, the description will be made only with respect to a speed detector which also relates to the present invention.

First of all, the prior art speed detector 4 shown in FIG. 3 will be described in operation.

If it is assumed that the rotational speed of the motor is $N_{mo}$ and the FG frequency is $f_c$, the relationship between these factors can be represented by:

$$f_c = 1/T_c = KG \cdot N_{mo} \tag{1}$$

where KG is a speed-frequency conversion constant.

It is now assumed that the rotational speed varies with the passage of time. Namely, it is assumed that:

$$N_m(t) = N_{mo} + \Delta N_m(t) \tag{2}$$

Figure 4:
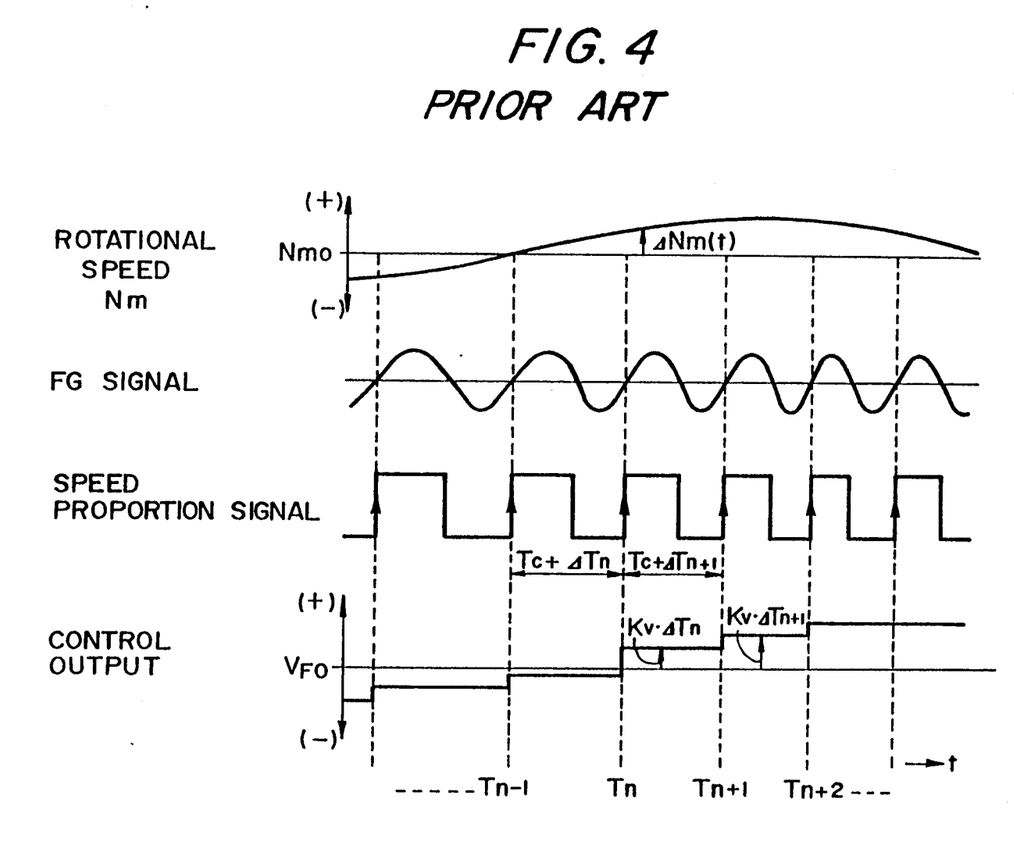
FIG. 4 is a timing chart illustrating the operation of the prior art system shown in FIG. 3.

The operation of the speed detector 4 at this time is shown in FIG. 4.

As the rotational speed in the motor 1 varies with the passage of time, the FG frequency is modulated to change the length of time between the adjacent leading edges in the speed proportion signal. The period detector 7 detects the changed time length and generates a corresponding control voltage. More particularly, as will be apparent from FIG. 4, the control output $V_F(t)$ is represented, when $T_n < t \leq T_{n+1}$ ($n = 0, \pm 1, \pm 2 \ldots$), by:

$$\begin{aligned} V_F(t) &= V_{FO} + \Delta V_F(t) \\ &= V_{FO} + K_V \cdot \Delta T_n \\ &= V_{FO} + K_V \cdot \{(T_n - T_{n-1}) - T_c\} \end{aligned} \tag{3}$$

where $V_{FO}$ is a control output voltage when the rotational speed $N_{mo}$ of the motor is constant, and $K_V$ is a period-voltage conversion constant (herein, having a minus polarity). For convenience, the minus polarity of the constant $K_V$ is intentionally selected since the polarity of $\Delta T$ is opposite to that of $\Delta N_m$. This is true of one embodiment of the present invention which will be described. Although the description made here uses the leading edges of the speed proportion signal to detect the length of time, the trailing edges thereof can be used similarly.

As will be apparent from FIG. 4, the process is directed to an FG signal modulating process. Namely, it comprises the steps of detecting a so-called "zero crossing time" in a modulated carrier to determine any change in the period of the carrier and then converting the change into a voltage to restore an original modulation signal. Therefore, it can be anticipated that if the modulation frequency is higher, the delay of phase is correspondingly increased.

Actually, if its assumed that the item $\Delta N_m(t)$ of the equation (2) is a single sinusoidal wave, or:

$$\Delta N_m(t) = \Delta N_{mo} \cos(2\pi f_m t + \theta_m) \tag{4}$$

where $f_m$ is a frequency at any changed rotational speed, $\theta_m$ is an initial phase and $\Delta N_{mo}$ is an amplitude at the changed rotational speed (peak zero value), and that the FG signal or carrier $V_c(t)$ is set by:

$$V_c(t) = \sin(2\pi f_c t) \tag{5}$$

and when the values $f_m$, $\theta_m$ and $\Delta N_{mo}$ are changed to various different values, it has been found that the delay of phase $\theta_v$ can be represented by the following equation as the demodulated output is processed to extract a fundamental wave component from Fourier expansion:

$$\theta_V \approx (360 \times f_m)/f_c [°] \quad (6)$$

From this equation (6), it becomes apparent that the delay $\theta_V$ is directly proportional to the value $f_m$ and inversely proportional to the value $f_c$.

The approximation of the equation (6) is taken as the reason why the speed detecting process detects the inverse of the frequency or a change in the period rather than the frequency itself and then generates an output voltage proportional to that change. The process may create some error if the regulation ($\Delta N_{mo}/N_{mo}$) is too large. From a trial calculation, however, it has been found that even if the regulation is set at a value much higher than the substantially negligible value in the actual system, for example, at a value equal to 10% of the peak zero value, the error in the value $\theta_V$ will be less than one percent. This delay of phase was also confirmed from an experiment in which the motor control system wa actually used.

Figure 5:
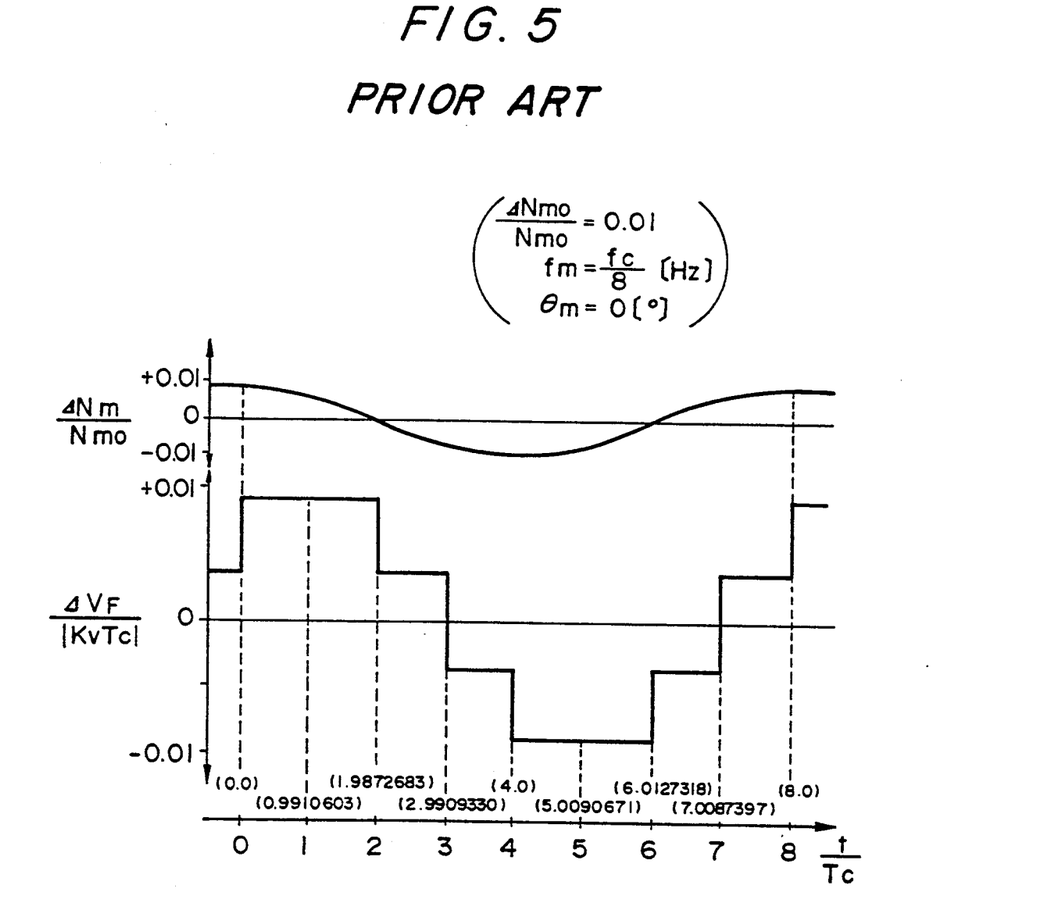
FIG. 5 is a diagram showing the control waveforms in the prior art system of FIG. 3.

FIG. 5 shows the values of $\Delta N_m(t)$ and $\Delta V_F(t)$ which were determined when it is assumed that in the equation (4), $$\left.\begin{array}{l} N_{mo}/N_{mo} = 0.01 = 1 \, [\%], \\ f_m = f_c/8 \, [\text{Hz}], \text{ and} \\ \theta_m = 0 \, [°] \end{array}\right\} \quad (7)$$

In FIG. 5, the bracketed numerals (t) represent times on detection. In such a case, from the equation (6), the delay of phase $\theta_V$ is represented by:

$$\theta_V \approx 360/8 = 45 \, [°] \quad (8)$$

This can be anticipated also from the waveform shown in FIG. 5.

From such a calculation, it is easily understood that if the detected time length of the FG signal for a half-period is converted into a voltage, the delay of phase $\theta_V$ becomes half the value determined from the equation (6). This is because this value is equivalent to two times the FG frequency in the aforementioned demodulating process.

Figure 6:
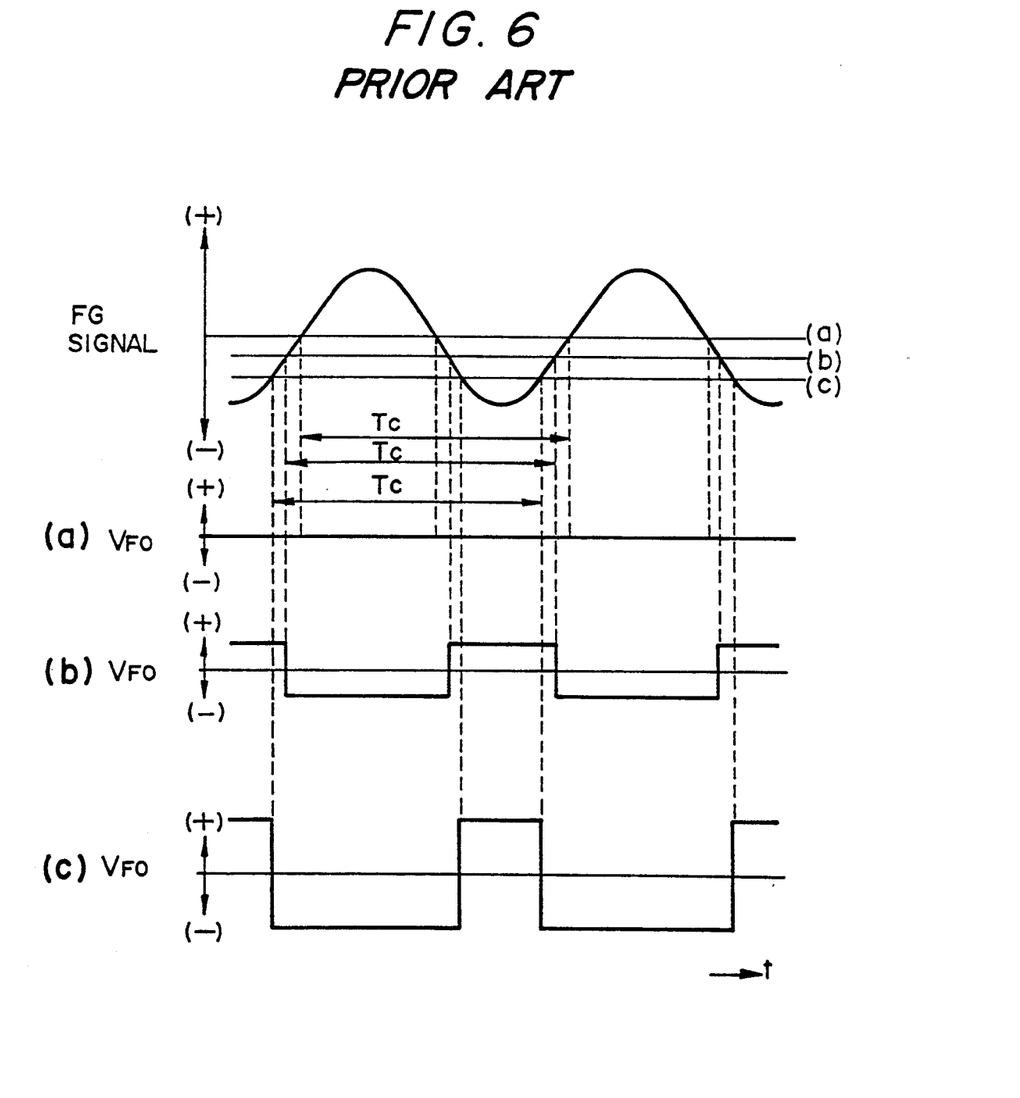
FIG. 6 illustrates various problems in the prior art system of FIG. 3.

In distinction from the detection of one complete period, however, outputs from the speed detector 4 (shown by b and c in FIG. 6) may create a ripple with any DC component even if the rotational speed has no variation and when the FG signal is distorted or when any offset is produced in the wave shaper 5 as shown in FIG. 6. This results in an increased irregularity in the rotation and deviation from the set speed.

Since the frequency of the basic ripple component corresponds to the FG frequency, a filter may be added into the system in order to avoid the increased irregularity in the rotation. However, the time constant must be sufficiently higher relative to the ripple frequency, and this will offset the aforementioned improvement of the phase delay involved with the detection of speed. Further measures may also be required.

This means that the actual speed control system cannot advantageously utilize the above half-period process of detecting the speed for a half period of the FG signal, with respect to performance and cost.

On the contrary, the complete period process of performing a detection for one complete period will not produce any ripple or any variation in the DC components even if any offset is produced in the shaper 5, as will be apparent from FIG. 6. As shown in FIG. 5, however, this complete period process will also produce a ripple in FG frequency when there is any variation in the rotational speed. Naturally, the magnitude of such a ripple is relatively large while the ripple frequency is relatively low, in comparison with the half-period process. Thus, the time constant in the subsequent filter 9 must be increased. The control system will be highly limited in performance when the value $\theta_V$ is combined with the phase delay, due to the increased time constant in filter 9.

Although the prior art utilizes the process of detecting the rotational speed by sensing an FG signal for one complete period as described above, this process must be used despite its unsatisfactory performance if various system limitations dictate that the FG frequency cannot be set at a desired level.

In order to overcome such a problem in the prior art, the applicant had proposed a system for controlling the rotational speed of a rotary member, which can prevent its performance from being lowered even if the FG frequency cannot be set at a satisfactory level in light of the standard performance of the prior art, or, in other words, which can provide an improved performance using the same FG frequency (see Japanese Patent Publication NO. 2-19712).

The applicant's previous invention will now be described with reference to FIG. 7.

Figure 7:
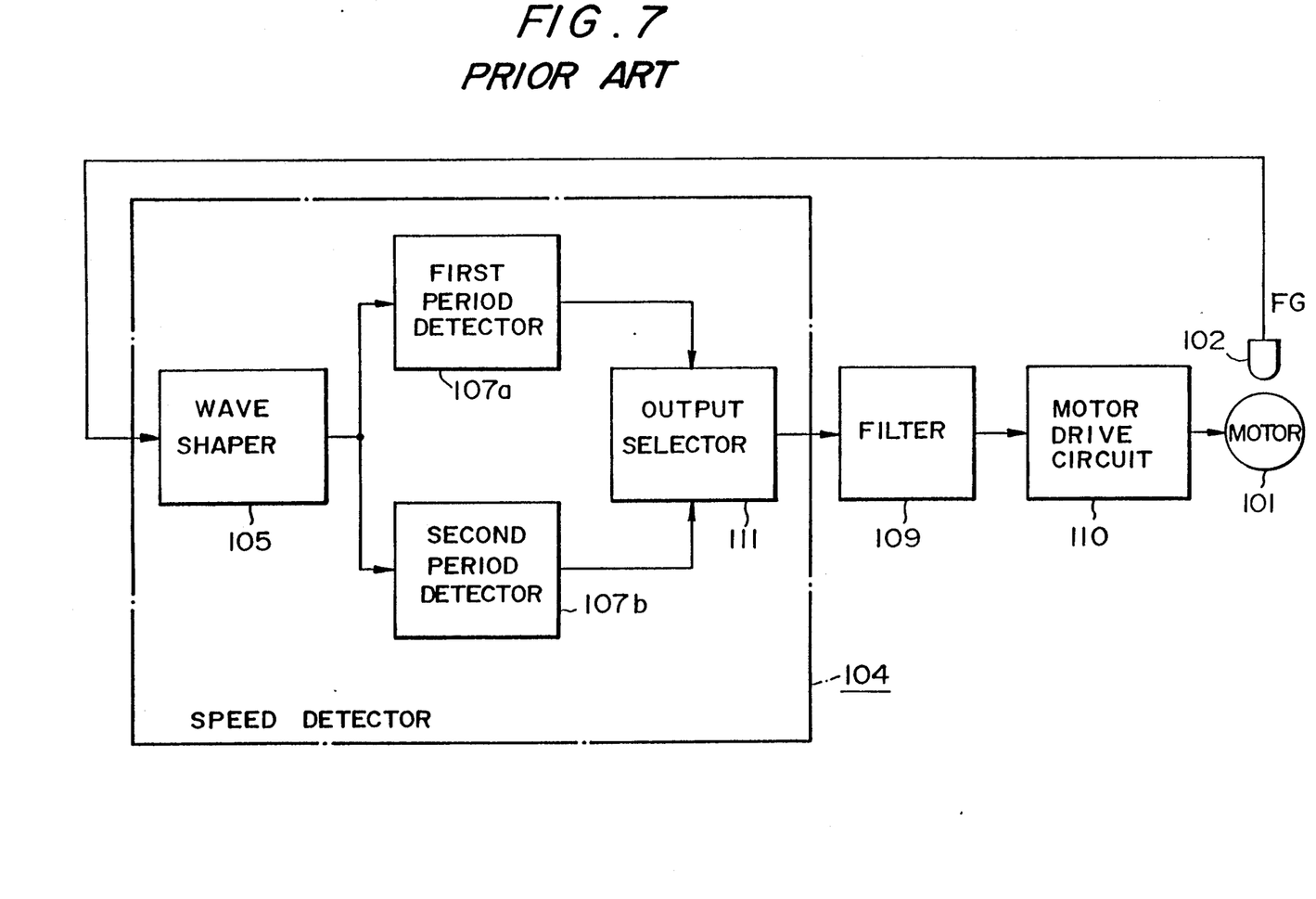
FIG. 7 is a block diagram of the circuit layout in the system previously proposed by the applicants.

Referring to FIG. 7, a speed control system comprises a motor 101; an FG 102; a speed detector 104; a shaper 105 for preparing a speed proportion signal having leading and trailing edges, based on an FG signal from the FG 102; a first period detector 107a for detecting the length of time (or period) between the adjacent leading edges of the speed proportion signal and generating a control output corresponding to the detected period; a second period detector 107b for detecting the length of time (or period) between the adjacent trailing edges of the speed proportion signal and generating a control output corresponding to the detected period; an output selector 111 for alternately selecting the outputs of the first and second period detectors 107a and 107b; a filter 109 for smoothing the output of the output selector 111 or performing the phase compensation of the control system; and a motor drive circuit 110.

Figure 8:
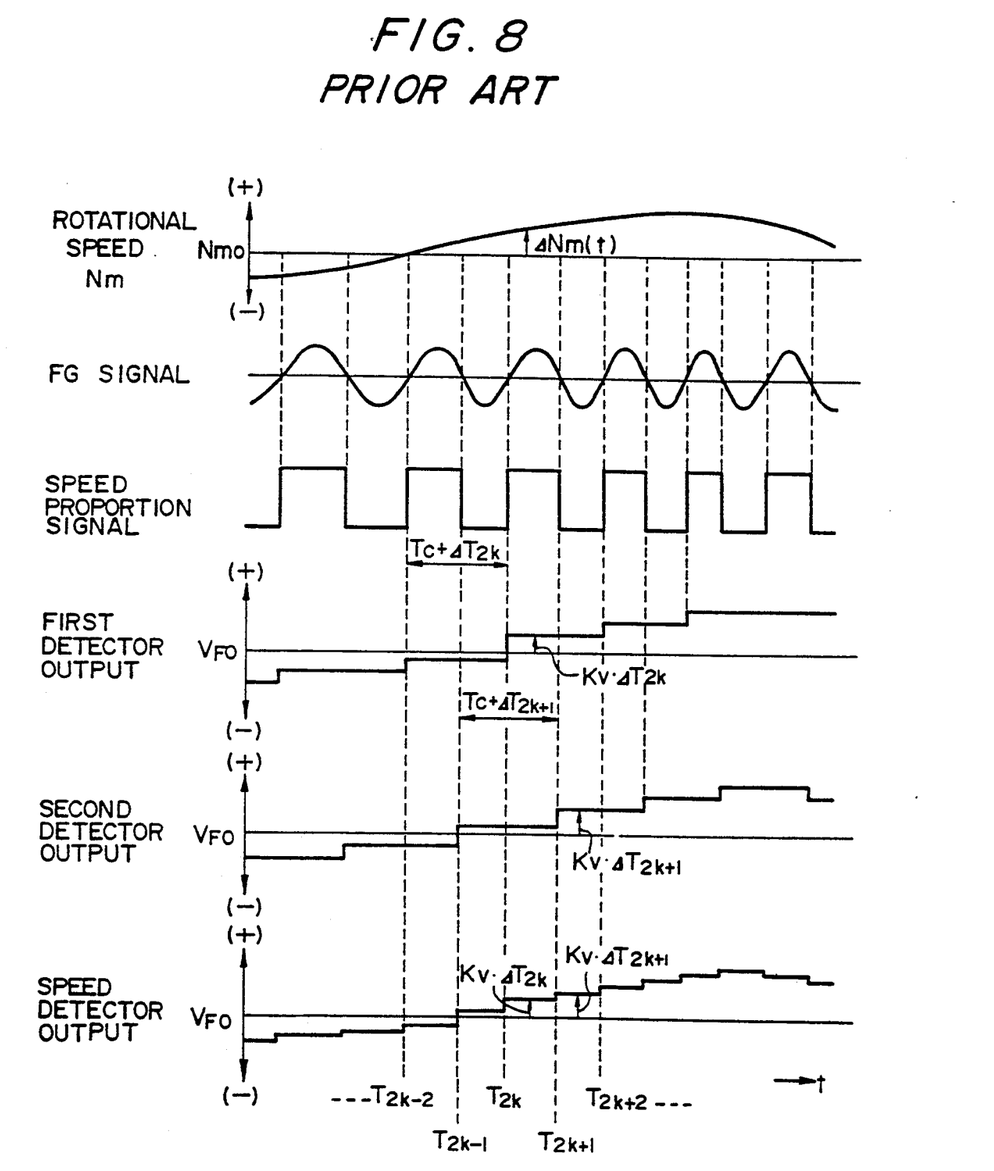
FIG. 8 is a timing chart illustrating the operation of the proposed system in FIG. 7.

As in the aforementioned arrangement according to the prior art, it is now assumed that the rotational speed of the motor varies with passage of time. The operation of the speed detector 104 made under such an assumption is shown in FIG. 8.

As the rotational speed of the motor 101 varies with passage of time, the FG signal is modulated, resulting in variations of the time lengths between the adjacent leading edges and between the adjacent trailing edges in the shaped speed proportion signal. The first period detector 107a responds to the changed time length between the adjacent leading edges to produce a control output while the second period detector 107b responds to the changed time length between the adjacent trailing edges to produce a control output. The first and second period detectors 107a and 107b define the same detection system as the aforementioned one-complete period detection system according to the prior art.

Therefore, the control output $V_{F1}$ of the first period detector 107a and the control $V_{F2}$ of the second period detector 107b are respectively represented, when $T_{2k} < t \leq T_{2k+2}$ ($k = 0, \pm 1, \pm 2 \ldots$), by:

$$V_{F1}(t) = V_{FO} + \Delta V_{F1}(t) \quad (9)$$
$$= V_{FO} + Kv \cdot \Delta T_{2k}$$
$$= V_{FO} + Kv\{(T_{2k} - T_{2k-2}) - T_c\}$$

and, when $T_{2k+1} < t \leq T_{2k+3}$ ($k = 0, \pm 1, \pm 2 \ldots$), by:

$$V_{F2}(t) = V_{FO} + \Delta V_{F2}(t) \quad (10)$$
$$= V_{FO} + Kv \cdot \Delta T_{2k+1}$$
$$= V_{FO} + Kv\{T_{2k+1} - T_{2k-1}) - T_c\}$$

The output selector 111 selects, as the output of the speed detector 104, the output of the first period detector 107a during a period of time between a time $T_{2k}$ when the output of the first period detector 107a changes from one value to another and a time $T_{2k+1}$ when the output of the second period detector 107b changes from one value to another. The output selector 111 also selects, as the output of the speed detector 104, the output of the second period detector 107b during a period of time between the time $T_{2k+1}$ and a time $T_{2k+2}$ when the output of the first period detector 107a changes from one value to another. Thus, the output $V_F$ of the speed detector 104 can be represented by:

$$V_F(t) = V_{F1}(t)(T_{2k} < t \leq T_{2k+1}) \text{ or} \quad (11)$$
$$V_{F2}(t)(T_{2k+1} < t \leq T_{2k+2})$$
$$(k = 0, \pm 1, \pm 2, \ldots)$$

It has been found herein that if the values $f_m$, $\theta_m$ and $\Delta N_{mo}$ in equation (4) are replaced with various numerical values and when the demodulated output $V_F$ obtained at each of the changed values is subjected to Fourier expansion to extract the basic wave component, the delay of phase $\theta_v$ can be represented by:

$$\theta_v \approx (270 \times f_m)/f_c \quad (12)$$
$$= \{(360 \times f_m)/f_c\} \times 0.75 \; [°]$$

The use of the approximation symbol in the above equation (12) is for the same reason as in the aforementioned example according to the prior art. It is thus understood that the speed detector 104 shown in FIG. 7 can be reduced in phase delay to a level about 25% smaller than that of the one-complete period detecting system according to the prior art.

Figure 9:
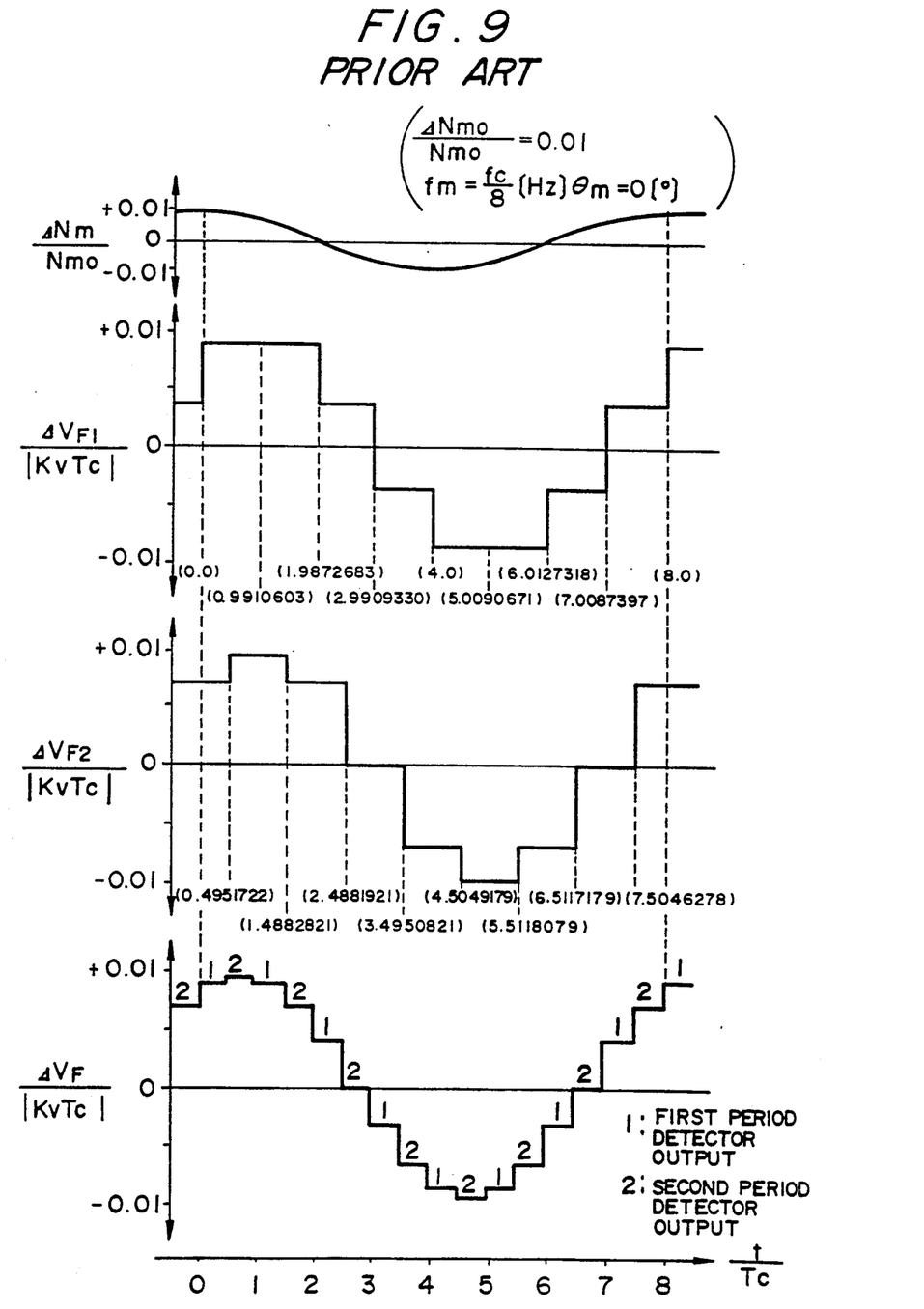
FIG. 9 is a diagram illustrating control waveforms in the proposed system of FIG. 7.

FIG. 9 shows $\Delta N_m(t)$ and $\Delta V_F(t)$ at the settings shown in the equation (7), as in the prior art of FIG. 3. The bracketed numerals (t) represent times on detection. In this case, from the equation (12), the delay of phase $\theta_v$ is:

$$\theta_v \approx 270/8 = 33.75° \quad (13)$$

It will be apparent from FIG. 9 that the speed control system has a reduced ripple and a doubled ripple frequency with the same advantages as those of the aforementioned half-period detection system. The increased ripple frequency also serves to decrease the time constant of the subsequent filter 109. This naturally involves the reduction of the phase delay in the control loop. Furthermore, the proposed system performs the detection of time length in the same manner as in the prior art one-complete period detection. Therefore, it does not have the disadvantages of the half-period detection, that is, any ripple created in the control output due to a distored FG signal or an offset in the shaper 105 or any deviation in the DC potential.

The speed detection system previously proposed by the applicants has many advantages in comparison with the prior art. However, it includes two additional problems in that the system requires two period detectors, resulting in enlargement of the entire circuit, and in that if the two period detectors are different in characteristics from each other, a difference between the outputs of these period detectors will be produced creating a ripple in the resulting control output having its basic frequency $f_c$ even when there is no variation in the rotational speed.

SUMMARY OF THE INVENTION

It is therefore an object of the present invention to provide a speed detector comprising a single half-period detection type detector element.

To this end, the present invention provides a system for controlling the rotational speed of a rotary member, said system comprising:

A) a frequency generator for generating an FG signal which is an AC signal having a frequency proportional to the rotational speed of said rotary member;

B) a zero crossing interval detector for detecting the zero crossing interval of said FG signal, the zero level corresponding to the desired rotational speed of said rotary member;

C) transfer means for holding the zero crossing interval detected by said zero crossing interval detector and then outputting said zero crossing interval in response to the next occurrence of a zero crossing;

D) adder means for summing the zero crossing interval detected by said zero crossing interval detector and the zero crossing interval outputted from said transfer means; and E) drive means for driving said rotary member in accordance with the result in said adder means such that the rotational speed of said rotary member will be consistent with the desired speed.

In such an arrangement, the zero crossing interval detector a zero crossing interval, that is, a half period of the modulated FG signal rather than a complete period thereof. The detected zero crossing interval is delayed by a half-period at the transfer means. The delayed zero crossing interval is summed with the zero crossing interval immediately after being detected, with the result being used to control the rotational speed of the rotary member.

Therefore, no delay of phase will be created even if the FG signal is increased in frequency. Also, with the use of a single zero crossing interval detector, the system can realize many advantages such as reduction of ripple, reduction of manufacturing cost and others.

Preferably, the present invention utilizes a wave shaper which serves as means for shaping the FG signal and then supplying it to the zero crossing interval detector. This makes the operation of the zero crossing interval detector more accurate. For example, with use of a wave shaper which is adapted to output a square-wave signal having a value variable on the zero crossing of the FG signal, the zero crossing interval detector may simply detect the time length required to change the value of this square-wave signal from one to another as a zero crossing interval in the FG signal. This means that the zero crossing interval detector can be operated more simply.

Figure 14:
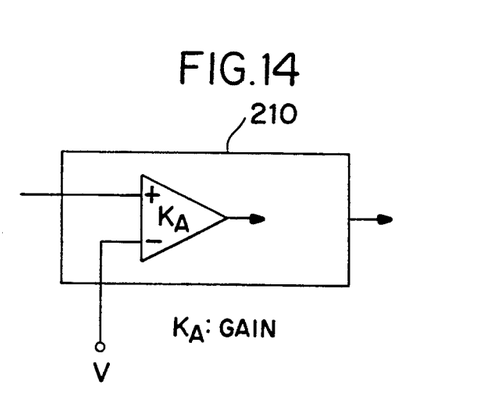
FIG. 14 illustrates the comparison made by the adder means illustrated in FIG. 1.

In the above arrangement of the present invention, the rotational speed of the rotary member can be controlled by the drive means, based on the comparison of DC voltages. More particularly, the drive means may compare the output of the adder means with a DC voltage representative of the desired rotational speed of the rotary member as shown in FIG. 14. If there is an difference between the output of the adder means and the DC voltage, the drive means may control the rotational speed of the rotary member such that such the difference is decreased as much as possible.

In another preferred embodiment a filter is provided in between the adder means and the drive means to optimize control. For example, such a filter may smooth the output of the adder means to make the speed control stable with a reduced noise level. Alternatively, the filter may perform any phase compensation so as to remove any phase delay from the speed control.

The transfer means may be of a variable characteristic type which does not depend on the filter and can vary the control characteristics (amplitude and phase-frequency characteristics) by regulating their coefficients.

The rotary member described may take many configurations such as drums and others. One of the most general means for rotatably driving the rotary member is a motor. The drive means may include such a motor. In such a case, the drive means further includes a motor drive circuit for controlling the rotational speed of the motor based on the result from the adder means.

DETAILED DESCRIPTION OF THE PREFERRED EMBODIMENT

The present invention will now be described with reference to one embodiment illustrated in the drawings.

Figure 1:
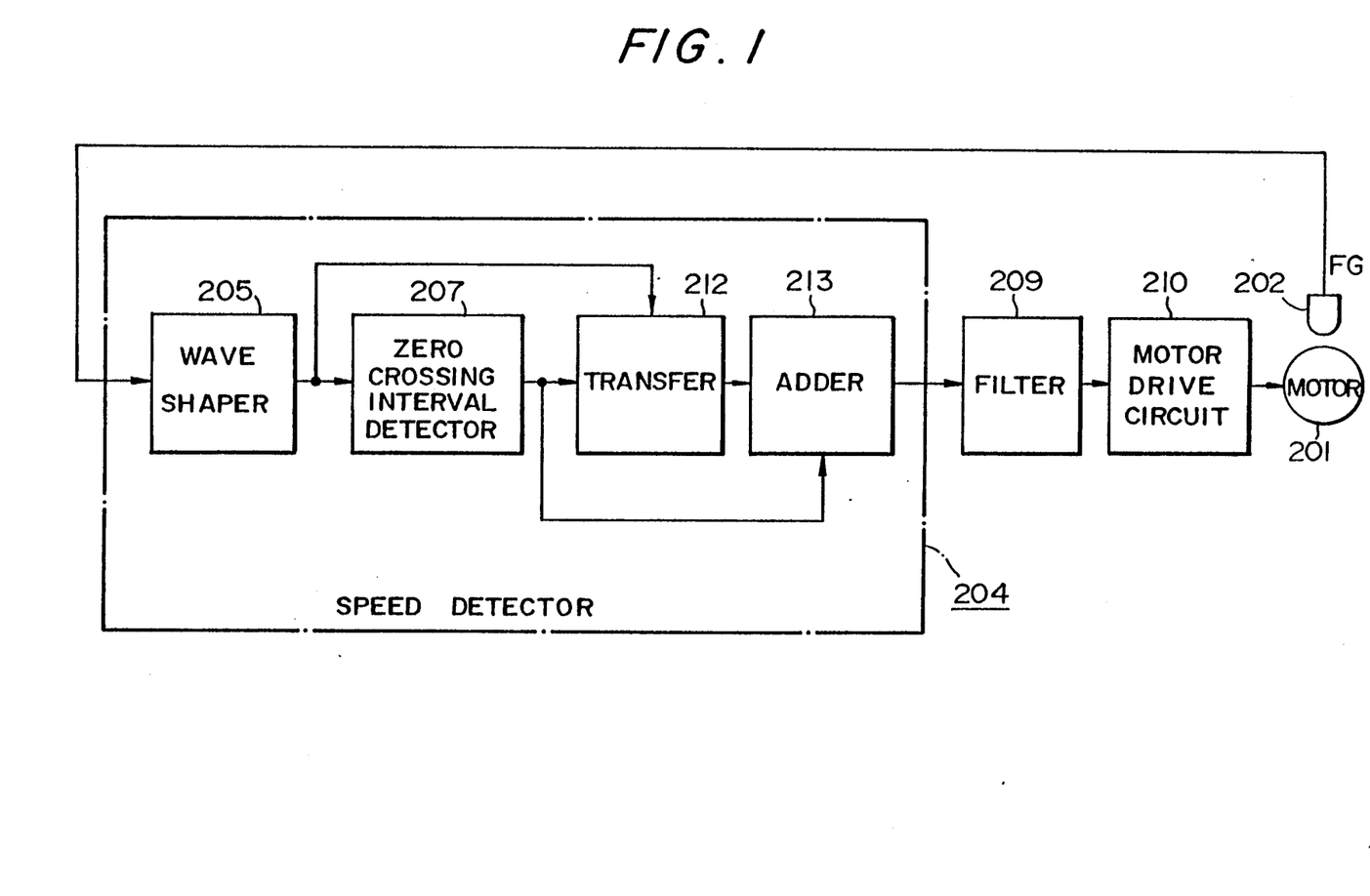
FIG. 1 is a block diagram of the circuit layout in one embodiment of a system for controlling the rotational speed of a rotary member, which is constructed in accordance with the present invention.

Referring to FIG. 1, there is shown a speed control system of the present invention which comprises a zero crossing interval detector 207 for detecting the time length of one half-period in a speed proportion signal; transfer means 212 for transferring a detection output in synchronization with the trailing edge of a speed proportional signal generated after passage of the other half-period thereof; and an adder 213 for summing the detection output an the transferred output to produce a control output or speed detector output.

In such an arrangement, it is assumed that the rotational speed of the rotary member varies with passage of time as in the aforementioned equation (2). The operation of a speed detector 204 at this time is shown in FIG. 2.

As the rotational speed of the motor 201 varies with passage of time, an FG signal will be modulated in frequency. As a result, the length of time between the adjacent leading and trailing edges of the shaped speed proportion signal, that is, the length of time during the half-period will vary correspondingly. The zero crossing interval detector 207 generates a detection output depending on the length of time during the half-period. The transfer means 212 transfers this detection output to a transfer output immediately after the next half-period.

Figure 2:
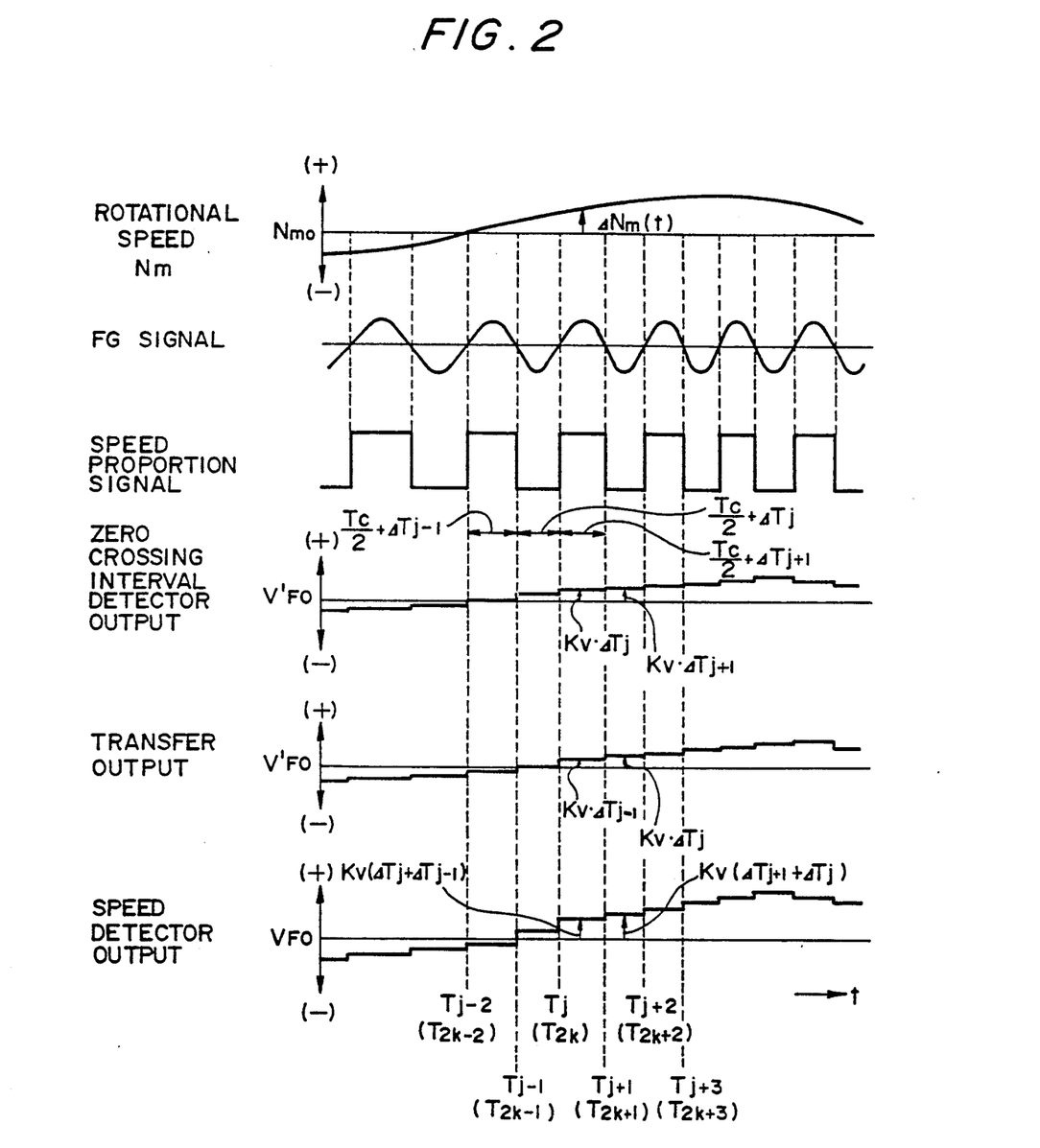
FIG. 2 is a timing chart illustrating the operation of the embodiment shown in FIG. 1.

As will be apparent from FIG. 2, the detection output $V_{F3}$ is thus represented, when $T_j < t \leq T_{j+1}$ ($j = 0, \pm 1, \pm 2, \ldots$), by:

$$\begin{aligned} V_{F3}(t) &= V_{FO} + \Delta V_{F3}(t) \\ &= V_{FO} + K_v \cdot \Delta T_j \\ &= V_{FO} + K_v \{(T_j - T_{j-1}) - T_c/2\} \end{aligned} \quad (14)$$

As will be apparent firm FIGS. 2 and 8, the value is identical with the value $T_{2k}$ if it is assumed that the rotational speed $N_m$ and the FG signal are the same as those of the previously mentioned structure of the prior art. The item $V'_{FO}$ is a detection output when the rotational speed $N_{mo}$ of the motor is constant. The $K_v$ is the same setting as that of the previously mentioned prior art example.

On the other hand, the output $V_{F4}$ of the transfer means 212 is represented, when $T_j < t \leq T_{j+1}$ ($j = 0, \pm 1, \pm 2, \ldots$), by:

$$\begin{aligned} V_{F4}(t) &= V_{FO} + \Delta V_{F4}(t) \\ &= V_{FO} + K_v \cdot \Delta T_{j-1} \\ &= V_{FO} + K_v \{(T_{j-1} - T_{j-2}) - T_c/2\} \end{aligned} \quad (15)$$

The adder 213 obtains a control output or speed detector output by summing the detection and transfer outputs together. Therefore, when $T_j < t \leq T_{j+1}$ ($j = 0, \pm 1, \pm 2, \ldots$), $$V_F(t) = V_{F3}(t) + V_{F4}(t) \qquad (16)$$
$$= 2V_{FO} + K_v(\Delta T_j + \Delta T_{j-1})$$
$$= 2V_{FO} + K_v[\{(T_j - T_{j-1}) - T_c/2\} + \{(T_{j-1} - T_{j-2}) - T_c/2\}]$$
$$= 2V_{FO} + K_v\{(T_j - T_{j-2}) - T_c\}$$

As described, since $T_j = T_{2k}$ and $T_{j-2} = T_{2k-2}$, when $T_j < t \leq T_{j+1}$ ($j = 0, \pm 1, \pm 2, \ldots$), $$V_F(t) = 2V_{FO} + K_v\{(T_{2k} - T_{2k-2}) - T_c\} \qquad (17)$$
$$= V_{F1}(t)$$

This is consistent with both the equations (9) and (11) if it is assumed that $2V'_{FO} = V_{FO}$.

Similarly, also when $T_{j+1} < t \leq T_{j+2}$ ($j = 0, \pm 1, \pm 2, \ldots$), $$V_F(t) = 2V_{FO} + K_v\{(T_{j+1} - T_{j-1}) - T_c\} \qquad (18)$$
$$= 2V_{FO} + K_v\{(T_{2k+1} - T_{2k-1}) - T_c\}$$
$$= V_{F2}(t)$$

This is also consistent with both the equations (10) and (11).

Since in the equations (17) and (18), the value $V'_{FO}$ is a setting without variation of the rotational speed, this means that it may be set as follows:

$$V'_{FO} = \tfrac{1}{2}V_{FO} \qquad (19)$$

It can be easily understood herein that the arrangement of FIG. 1 is perfectly equivalent in performance to that of FIG. 7 since the value $V'_{FO}$ is a parameter completely irrespective of the transfer characteristic on the variations of speed.

It is thus proven that the advantages of the present invention such as reduction of phase delay, improvement of ripple, invariable DC potential and so on are completely equivalent to those of the system previously proposed by the applicants. And yet, such advantages of the present invention can be accomplished using only a single zero crossing interval detector, resulting in simplification of the circuit layout and further reduction of the manufacturing cost.

Although the system previously proposed by the applicants is disadvantageous in that the differential characteristics between the two period detectors used therein produces a ripple in the basic frequency $f_c$, the present invention utilizes a single zero crossing interval detector which will not cause such a problem, resulting in provisions of the speed controller having an extremely high accuracy.

The arrangement of the present invention which includes the transfer means 212 and the adder means 213 is extremely similar to a transversal type filter. In fact, it can be understood that, as variation in the rotational speed is indefinitely decreased, the interval between transfers gradually approaches $T_c/2$, with the extreme limit providing a transversal type filter having a delay equal to $T_c/2$ and a coefficient equal to one.

If the transfer means 212 is made to have a coefficient regulating function, the speed detector can be varied in amplitude and phase-frequency characteristic. In other words, the speed control system can have an additional function for regulating its response without being dependent on the subsequent filter 209. This advantage cannot be obtained in the system previously proposed by the applicants (see Japanese Patent Publication No. Hei 2-19712).

Although the speed detector 204 includes the wave shaper 205 at the first stage thereof, the wave shaper 205 can be omitted if the FG signal has such a waveform as in the speed proportion signal, that is, a waveform having leading and trailing edges. The operation of zero-crossing interval detector 207 is explained with reference to FIGS. 10 and 11. A pulse $S_2$ is formed from a speed proportional signal $S_1$, and two pulses $S_3$ and $S_4$ which have specific widths of $T_1$ and $T_2$ ($T_2 << T_1 < T_c/2$) are also formed from $S_1$ through two monostable multi-vibrators (B) and (C) respectively. A pulse $S_5$ is formed from a trailing edge of $S_4$. A pulse $S_6$ is derived from pulse $S_3$ through a sawtooth wave generator (E) which is triggered by the trailing edge of $S_3$. A gradient part of $S_6$ is used to perform sample and hold (S/H) using $S_5$. A detection output signal $S_7$, of which level correspond to the half period length of the spaced proportional signal is formed through all of the steps described above.

Figure 10:
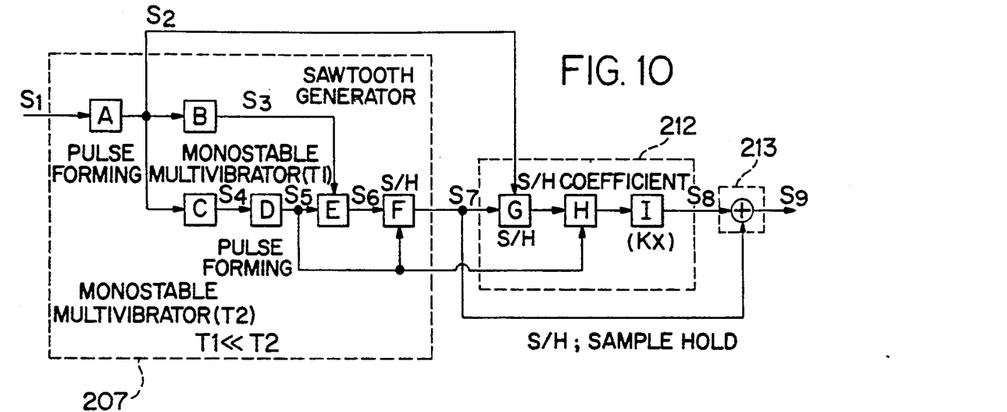
FIGS. 10 and 11 illustrate the operation of the zero crossing interval detector of FIG. 1.
Figure 11:
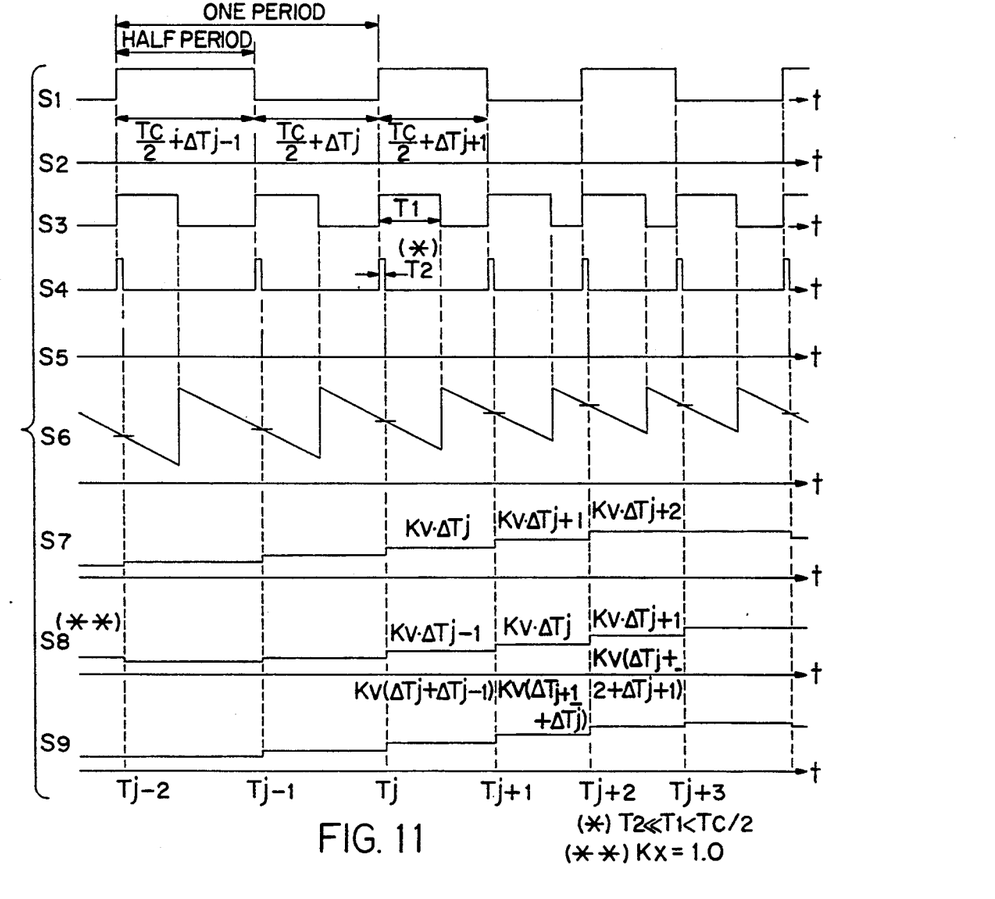

Secondly, $S_7$ is separately input into adder (213) and a sample and hold circuit (G) in transfer means (212), and the pulse $S_2$, which comes faster (by $T_2$) than the pulse $S_5$, samples and holds $S_7$. That is, the sampling timing of sample and hold circuit (G) is small prior to that of sample and hold circuit (F), so that the value of $S_7$ equals that of $S_6$ in the previous half period. The output (G) is newly sampled and held in (H) by means of the pulse $S_5$ and justifies this sample and hold timing with that of $S_7$, so that the output (G) turns into a transfer output $S_8$. Speed detector (204) outputs $S_9$ which is the sum of $S_7$ and $S_8$. In this example $K_x = 1.0$.

Further, $T_2$ should be as small a possible, because it is used to delay the half period of $S_7$. That is, it is not difficult to skip the sample and hold done by $S_5$ in (H) and direct the sample and hold output of (G) to the coefficient, when $T_2$ is set negligibly small compared with $T_c/2$. Furthermore, since $T_2$ can take a sufficiently small value, the operation of this embodiment is the same as that shown in FIG. 2.

Figure 12:
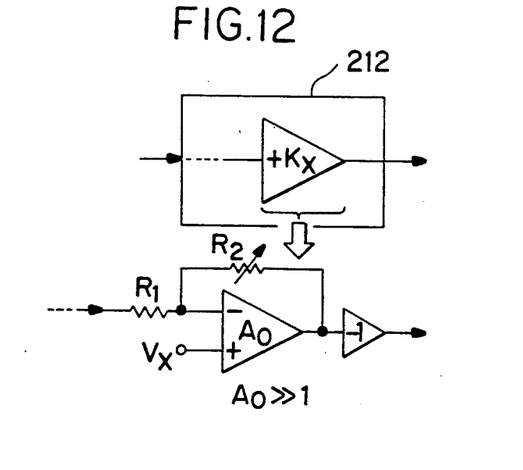
FIG. 12 illustrates variable characteristics of the transfer means of FIG. 1.

The transfer gain $K_X$ of transfer mean 212 can have characteristics which are variable. As FIG. 12 shows, variable characteristics are present when a variable gain amplifier is set in the output state of transfer 212. Altering a feedback resistance $R_2$ is the most convenient method of changing the gain $K_X$ is employed in the transfer 212, both amplitude and phase characteristics of a speed detector become variable.

Further, when a variable transfer gain $K_X$ is employed, both characteristics of amplitude and phase of the zero crossing interval detector 207 and adder 213 also become variable.

Figure 13:
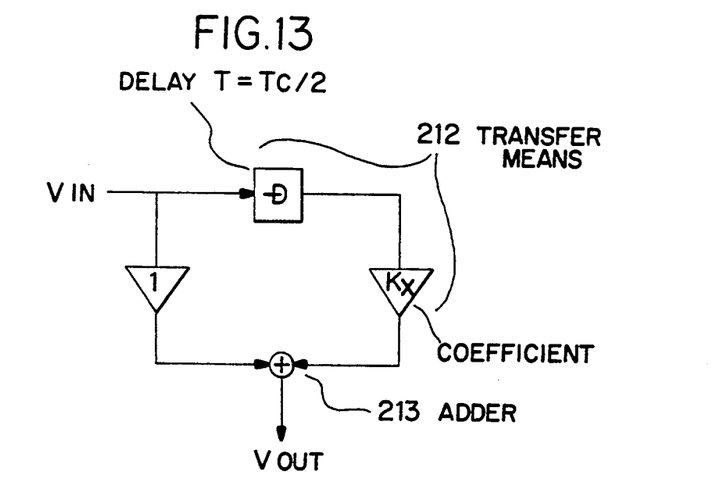
FIG. 13 illustrates the transfer means and adder acting as a transversal filter.

Further, assume that the speed variation is minimized as much as possible. In this case as shown in FIG. 13, the transfer means (212) and the adder (213) serve as a transversal filter having a delay time T ($= T_c/2$), where $$Vout(t) = Vin(t) + K_X\, Vin(t - T) \qquad (19)$$

By rewriting equation (19) using Z,
$$Vout(Z) = (1 + K_X\, Z^{-1})Vin(Z) \qquad (20)$$

when speed variation is minimized as much as possible. Therefore, the transfer function H(Z) is:

$$H(Z) = 1 + K_x Z^{-1} \quad (21)$$
where, $X = \exp(-j2\pi fT)$.

$$\begin{aligned} H(Z)|_z &= \exp(j2\pi fT) = 1 + Kx \cdot \exp(-j2\pi fT) \\ &= 1 + Kx\{(\cos(2\pi fT) - j\sin(2\pi fT)\} \\ &= |G(f)| \cdot \exp(j\angle G(f)). \end{aligned} \quad (22)$$

the amplitude equals:

$$|G(f)| = \sqrt{\{1 + K_x \cos(2\pi fT)\}^2 + \{K_x \sin(2\pi fT)\}^2}$$

and the phase equals:

$$\angle G(f) = \arctan\left( \frac{-k_x \sin(2\pi fT)}{1 + k_x \cos(2\pi fT)} \right)$$

Therefore, it is known that the phase frequency characteristics also vary with Kx. When Kx=1 (which is very general and a value specified in this embodiment), equation (22) is rewritten as:

$$H(8)|_{8=\exp(j2\pi fT)} = 2 \cdot \cos(\pi fT) \cdot \exp(-j\pi fT), \text{ where } \quad (23)$$
the amplitude is $|G(f)| = 2 \cdot \cos(\pi fT)$ and $\quad (24)$
the phase is $\angle G(f) = -\pi fT \quad (25)$ The zero crossing interval detection may be accomplished by any other suitable means if it can be provide the aforementioned operation of the speed controller, such as a CR circuit adapted to perform electric charge and discharge, a counter utilizing clock signals to count the length of the period, and so on.

Although the detection output has been described as the sample holding type, it may be in the form of output counts from the aforementioned counter utilizing clock signals. In such a case, obviously, the transfer means 212 may transfer and output the above counts. It is of course an easy operation for the adder 213 to sum these two counts.

Although the output of the speed detector 204 has been shown as being of the sample and hold type, the similar advantage may apparently be obtained even by using a so-called pulse width modulation system for changing the duty cycle of the output depending on variations of the period.

Although the preferred embodiment of the present invention has been described with reference to the direct drive of the rotary member, the similar advantage may be obtained even by any other drive mechanism such as a belt drive.

Since the present invention provides a speed controller for detecting the length of time or zero crossing interval between the adjacent edges in the signal proportional to the rotational speed of the rotary member, transferring the detected signal at each of the half-periods and summing the transferred signal with the detection output to form a control output, the speed controller of the present invention provides completely the same advantages as in the system previously proposed by the applicants and also additional advantages such that the entire system can be inexpensively manufactured with an improved accuracy.

What is claimed is:

1. A system for controlling the rotational speed of a rotary member, said system comprising:
   a frequency generator for generating an FC signal which is an AC signal having a frequency proportional to the rotational speed of said rotary member;
   a zero crossing interval detector for detecting the zero crossing interval of said FG signal, the zero crossing interval being inversely proportional to the rotational speed of said rotary member;
   transfer means for holding the zero crossing interval detected by said zero crossing interval detector and then outputting said zero crossing interval in response to the next occurrence of zero crossing;
   adder means for summing the zero crossing interval detecting by said zero crossing interval detector and the zero crossing interval outputted from said transfer means; and
   drive means for driving said rotary member in accordance with the result from said adder means such that the rotational speed of said rotary member is controlled to be consistent with a desired speed.

2. A system as defined in claim 1, further comprising wave shaper means for shaping the FG signal and then supplying the shaped FG signal to said zero crossing interval detector.

3. A system as defined in claim 2 wherein the output of said wave shaper means is a square-wave signal having a value variable on the zero crossing of the FG signal and wherein said zero crossing interval detector detects the interval between subsequent changes in the value of the square-wave signal as a zero crossing interval in the FG signal.

4. A system as defined in claim 3 wherein the output of said zero crossing interval detector is a DC voltage having a value corresponding to the interval between subsequent changes in the value of the square-wave signal and wherein said drive means compares the output of said adder means with a DC voltage representative of the desired rotational speed of said rotary member to obtain a difference if any, said drive means being adapted to control the rotational speed of said rotary member such that said difference is reduced.

5. A system as defined in claim 2 wherein the output of said zero crossing interval detector is a DC voltage having a value corresponding to the zero crossing interval of the FG signal and wherein said drive means compares the output of said adder means with a DC voltage representative of the desired rotational speed of said rotary member to obtain a difference if any, said drive means being adapted to control the rotational speed of said rotary member such that said difference is reduced.

6. A system as defined in claim 1, further comprising a filter for smoothing the output of said adder means and supplying a smoothed signal to said drive means.

7. A system as defined in claim 6 wherein the output of said zero crossing interval detector is a DC voltage having a value corresponding to the zero crossing interval of the FC signal and wherein said drive means compares the smoothed signal with a DC voltage representative of the desired rotational speed of said rotary member to obtain a difference if any, said drive means being adapted to control the rotational speed of said rotary member such that said difference is reduced.

8. A system as defined in claim 1, further comprising a filter for phase compensating the output of said adder means and supplying a compensated signal to said drive means.

9. A system as defined in claim 8 wherein the output of said zero crossing interval detector is a DC voltage having a value corresponding to the zero crossing interval of the FG signal and wherein said drive means compares the compensated signal with a DC voltage representative of the desired rotational speed of said rotary member to obtain a difference if any, said drive means being adapted to control the rotational speed of said rotary member such that said difference is reduced.

10. A system as defined in claim 1 wherein said transfer means is of a variable characteristic type which can change the amplitude and phase-frequency characteristic of its own output by regulating their coefficients.

11. A system as defined in claim 1 wherein said drive means comprises:
a motor for rotating said rotary member; and
a motor drive circuit for controlling the rotational speed of said motor based on the result from said adder means.

12. A system as defined in claim 11, further comprising wave shaper means for shaping the FG signal and then supplying the shaped FG signal to said zero crossing interval detector.

13. A system as defined in claim 12 wherein the output of said wave shaper means is a square-wave signal having a value variable on the zero crossing of the FG signal and wherein said zero crossing interval detector detects the interval between subsequent changes in the value of the square-wave signal as a zero crossing interval in the FG signal.

14. A system as defined in claim 13 wherein the output of said zero crossing interval detector is a DC voltage having a value corresponding to the interval between subsequent changes in the value of the square-wave signal and wherein said drive means compares the output of said adder means with a DC voltage representative of the desired rotational speed of said rotary member to obtain a difference if any, said drive means being adapted to control the rotational speed of said rotary member such that said difference is reduced.

15. A system as defined in claim 12 wherein the output of said zero crossing interval detector is a DC voltage having a value corresponding to the zero crossing interval of the FG signal and wherein said drive means compares the output of said adder means with a DC voltage representative of the desired rotational speed of said rotary member to obtain a difference if any, said drive means being adapted to control the rotational speed of said rotary member such that said difference is reduced.

16. A system as defined in claim 11, further comprising a filter for smoothing the output of said adder means and supplying a smoothed signal to said drive means.

17. A system as defined in claim 16 wherein the output of said zero crossing interval detector is a DC voltage having a value corresponding to the zero crossing interval of the FG signal and wherein said rive means compares the smoothed signal with a DC voltage representative of the desired rotational speed of said rotary member to obtain a difference if any, said drive means being adapted to control the rotational speed of said rotary member such that said difference is reduced.

18. A system as defined in claim 11, further comprising a filter for phase compensating the output of said adder means and supplying a compensated signal to said drive means.

19. A system as defined in claim 18 wherein the output of said zero crossing interval detector is a DC voltage having a value corresponding to the zero crossing interval of the FG signal and wherein said drive means compares the compensated signal with a DC voltage representative of the desired rotational speed of said rotary member to obtain a difference if any, said drive means being adapted to control the rotational speed of said rotary member such that said difference is reduced.

20. A system as defined in claim 11 wherein said transfer means is of a variable characteristic type which can change the amplitude and phase-frequency characteristic of its own output by regulating their coefficients.

21. A system for controlling the rotational speed of a rotary member, comprising:
a frequency generator for generating an FG signal, which is an AC signal having a frequency proportional to the rotational speed of said rotary member;
zero crossing interval detecting means for detecting a plurality of zero crossing intervals of said FG signal, each of the plurality of zero crossing intervals being inversely proportional to the rotational speed of said rotary member;
transfer means for delaying each of the plurality of zero crossing intervals detected by said zero crossing interval detecting means and then outputting each of the plurality of zero crossing intervals in response to the next one of the plurality of detected zero crossing intervals;
adder means for summing the plurality of zero crossing intervals detected by said zero crossing interval detecting means and the output by said transfer means; and
drive means for driving said rotary member in accordance with the sum from said adder means such that the rotational speed of said rotary member is controlled to be consistent with a desired rotational speed.

22. The system of claim 21, further comprising wave shaper means for shaping the FG signal and then supplying the shaped FG signal to said zero crossing interval detecting means.

23. The system of claim 22 wherein the shaped FG signal supplied by said wave shaper means is a square-wave signal having a variable value and wherein said zero crossing interval detecting means detects an interval between subsequent changes in the variable value of the square-wave signal as one of the plurality of zero crossing intervals in the FG signal.

* * * * *